UNITED STATES PATENT OFFICE.

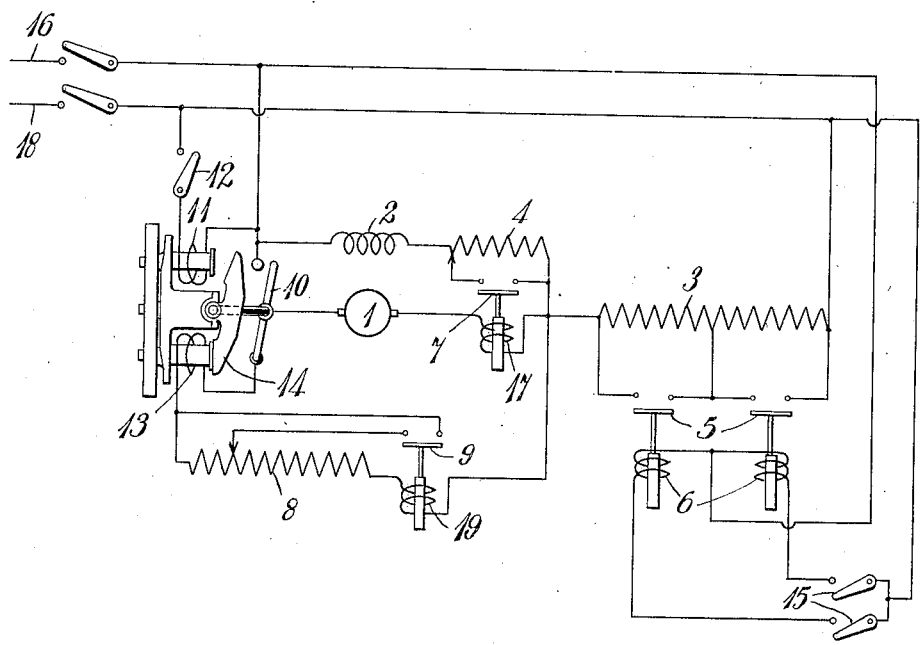

JOHN H. ALBRECHT, OF PITTSBURGH, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,152,376.      Specification of Letters Patent.      Patented Aug. 31, 1915.

Application filed July 29, 1913. Serial No. 781,736.

*To all whom it may concern:*

Be it known that I, JOHN H. ALBRECHT, a citizen of the United States, and a resident of Pittsburgh, in the county of Allegheny and State of Pennsylvania, have invented a new and useful Improvement in Motor-Control Systems, of which the following is a specification.

My invention relates to motor control systems and particularly to such systems as employ dynamic braking for bringing motors to rest quickly and safely.

My invention has for its object to provide a simple and effective means whereby the armature of a motor may be brought to rest quickly at a time when the field strength is low and without causing sparking at the commutator.

In the operation of motors in connection with planers and similar machines in which frequent stops and reversals are necessary, it is frequently desirable to bring the motor armature to rest quickly at a time when the field strength is relatively low. It has been found that, if the motor be retarded or stopped by dynamic braking while the field is thus weakened, sparking will occur at the commutator when the dynamic braking current becomes excessive. It has been proposed to cut out the field resistor when the dynamic brake is applied but, owing to the inductive effect of the field windings, the full strength of the magnetic field is not immediately effective and sparking occurs at the commutator. I provide means whereby the dynamic braking current is permitted to increase only as the field strength builds up.

My invention consists broadly in providing the electromagnetic switch or relay which controls the dynamic braking circuit with a series winding that operates to close the switch when the field current is of such a value as to cause the armature current to reach a predetermined value.

In the accompanying drawings, the single figure is a diagrammatic view of circuits and apparatus embodying my invention.

The motor to be controlled comprises an armature 1 and a shunt field winding 2. A sectional starting resistor 3 is connected in series with the armature 1, and a variable resistor 4 is in series with the shunt field winding 2. The starting resistor 3 is controlled by electromagnetic switches 5 which comprise windings 6 that are connected in shunt to the armature 1. The windings 6 are so adjusted as to successively close the respective switches 5 when the counter electromotive force of the motor reaches a predetermined value. The field resistor 4 is controlled by an electromagnetic switch 7 which is normally closed but which opens when the starting resistor 3 is short circuited and thereby accelerates the motor by reducing the field current.

An adjustable resistor 8 is in the dynamic braking circuit of the motor and is controlled by an electromagnetic switch 9 which is arranged to close when the braking current reaches a predetermined value that is higher than that arranged for the switch 7. A single pole double throw electromagnetic switch 10 controls the dynamic braking circuit.

The switch 10 comprises a shunt coil 11, the circuit of which is controlled by a switch 12, and a series coil 13 which is connected in circuit with the armature 1 when the dynamic braking circuit is closed by the switch 10. The coil 11, when energized, operates the switch 10 to close the normal running circuit of the motor. When the coil 11 is deënergized, the armature 14 of the switch 10 is drawn downwardly by force of gravity to open the running circuit and to close the dynamic braking circuit. The coil 13 is thereby connected in series to act as a holding coil for the switch 10.

The operation of the system is as follows: When the line switch and switches 12 and 15 are closed, current flows from the positive line conductor 16, through the switch 10, armature 1, coil 17 and resistor 3 to the negative line conductor 18. The coil 17 is energized to close the switch 7 and thereby short circuit the resistor 4 to allow the field winding 2 to receive a maximum value of current. As the motor speed increases, the counter electromotive force reaches predetermined values which cause the switches 5 to successively short circuit the sections of the resistor 3. When the armature current decreases to a predetermined value, the switch 7 opens and further accelerates the motor by inserting the resistor 4 in circuit with the field winding 2.

To stop the motor, the operator opens the switch 12. The coil 11 is deënergized to allow the armature 14 to drop downwardly by force of gravity and thereby open the running circuit and close the dynamic braking circuit of the motor. The braking circuit extends from the armature 1 through the switch 10, series coil 13, resistor 8, coil 19 of the switch 9, and the coil 17 to the armature 1. The coil 17 is energized to close the switch 7 and short-circuit the resistor 4. The resistor 8 is adjusted to such a value that the first rush of current will not cause sparking at the commutator. The coil 19 is so adjusted as not to close the switch 9 until the current reaches a predetermined value. The initial braking current will be relatively weak because the braking circuit then includes the resistor 8 and because the circuit is closed practically simultaneously with the switch 17, and an appreciable interval of time is required for the field current to build up. The braking current increases as the field strength builds up and, when a predetermined value is reached, the coil 19 is energized to close the switch 9 and thereby short circuit the resistor 8. The braking current and the braking torque upon the motor are then greatly increased. No sparking will take place at the commutator, however, as the field strength is sufficiently high to generate the increased current without disturbing the commutation of the motor. The motor will then be brought quickly to rest.

It will be understood that the adjustments of the several resistors will depend upon various conditions, such as the speed at which the motor is to be operated and upon how quickly the motor is to be stopped.

In the system which I have provided, the braking current is automatically increased with the field strength, and commutation disturbances are thereby avoided.

I claim as my invention:

1. The combination with an electric motor and a dynamic braking circuit therefor comprising a resistor, of a switch for controlling said circuit, and means for shunting said resistor when the current in said braking circuit reaches a predetermined maximum value.

2. The combination with an electric motor, of a field resistor therefor, a dynamic braking circuit for said motor comprising a resistor, and switches having coils in said braking circuit for controllng said resistors.

3. The combination with an electric motor and a dynamic braking circuit therefor, of an electromagnetic switch for controlling said circuit, a resistor in said circuit, and means operable at a predetermined maximum value of current in said circuit for controlling said resistor.

4. The combination with an electric motor and a braking resistor therefor, of means for connecting said resistor in a short circuit with the motor armature, and means for short circuiting said braking resistor when the braking current reaches a predetermined maximum value.

5. The combination with an electric motor and a braking resistor therefor, of means for connecting said resistor in a short circuit with the motor armature, and an electromagnetic switch having a coil in said short circuit for controlling said brake resistor, said coil being arranged to actuate the switch when the current traversing said circuit reaches a predetermined maximum value.

6. The combination with an electric motor, of a field resistor therefor, a dynamic braking circuit for said motor comprising a resistor, and switches having coils in said circuit for short-circuiting said resistors at predetermined values of braking current.

7. The combination with an electric motor, of a field resistor therefor, a switch for controlling said resistor, means for causing said motor to generate a dynamic braking current, an electromagnetic switch for controlling the braking current and having a coil which actuates said electromagnetic switch when the braking current reaches a predetermined maximum value.

8. The combination with an electric motor, of a field resistor therefor, means for automatically controlling said resistor, a dynamic braking circuit for said motor, a resistor in said circuit, and means for short circuiting said resistor when the braking current reaches a predetermined maximum value.

9. The combination with an electric motor, of a field resistor therefor, a switch for controlling said resistor and having an actuating coil arranged to operate at a predetermined current value, a dynamic braking circuit for said motor comprising said coil, and means for controlling the braking current and arranged to operate when the braking current reaches a second and higher predetermined value.

10. The combination with an electric motor and a field resistor therefor, of a dynamic braking circuit for said motor comprising a resistor, an electromagntic switch for short-circuiting said field resistor when the current traversing said braking circuit reaches a predetermined value, and an electromagnetic switch for short-circuiting said brake resistor at a second and higher predetermined value of the braking current.

11. The combination with an electric motor and a braking resistor therefor, of a controlling switch arranged to connect said resistor in a short circuit with the motor armature, and a switch for short-circuiting said braking resistor when the braking current reaches a predetermined maximum value.

In testimony whereof, I have hereunto subscribed my name this 24th day of July, 1913.

JOHN H. ALBRECHT.

Witnesses:
  W. O. LUM,
  B. B. HINES.